United States Patent
Ito et al.

(10) Patent No.: US 11,350,076 B2
(45) Date of Patent: May 31, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Tatsuya Ito, Kawasaki (JP); Rei Ishikawa, Wako (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/937,372

(22) Filed: Jul. 23, 2020

(65) Prior Publication Data
US 2021/0029342 A1    Jan. 28, 2021

(30) Foreign Application Priority Data
Jul. 26, 2019 (JP) ............................. JP2019-138006

(51) Int. Cl.
*H04N 13/167* (2018.01)
*H04N 13/111* (2018.01)
(Continued)

(52) U.S. Cl.
CPC ......... *H04N 13/167* (2018.05); *H04N 5/2224* (2013.01); *H04N 5/2228* (2013.01);
(Continued)

(58) Field of Classification Search
CPC .................. H04N 2013/0085; G06K 9/00758
See application file for complete search history.

(56) References Cited

U.S. PATENT DOCUMENTS 5,850,352 A * 12/1998 Moezzi .................. G06T 15/10
345/419
10,623,715 B2 * 4/2020 Adachi .................. H04N 5/232
(Continued)

FOREIGN PATENT DOCUMENTS

EP    3346695 A1    7/2018
JP    6482498 B     3/2019

OTHER PUBLICATIONS

Yusuke Inoue, et al., Situation-Based Dynamic Frame-Rate Control for On-Line Object Tracking, International Japan-Africa Conference on Electronics, Communications and Computations (JAC-ECC), IEEE, Dec. 17, 2018, pp. 119-122.

*Primary Examiner* — Brian P Yenke
(74) *Attorney, Agent, or Firm* — Canon U.S.A., Inc. IP Division

(57) ABSTRACT

An apparatus acquires update information indicating a predetermined frame update interval on a moving image at a virtual viewpoint reproduced by updating a virtual viewpoint image at the interval, the virtual viewpoint image being generated using multi-viewpoint images and viewpoint information; acquires frame information of the multi-viewpoint images for use in generating the moving image, the frame information including information of a plurality of frames corresponding to different imaging times; and generates the viewpoint information based on the update information and the frame information, such that the viewpoint information indicating a position of a virtual viewpoint and a direction from the virtual viewpoint updated at an interval longer than the predetermined frame update interval is generated as the viewpoint information for the moving image generated using a smaller number of frames of multi-viewpoint images than frames of virtual viewpoint images forming the moving image.

19 Claims, 10 Drawing Sheets

(51) Int. Cl.
  *H04N 13/282* (2018.01)
  *H04N 13/117* (2018.01)
  *H04N 5/222* (2006.01)
  *G06T 15/20* (2011.01)
  *G06K 9/00* (2006.01)
  *H04N 13/00* (2018.01)

(52) U.S. Cl.
  CPC ......... *H04N 13/111* (2018.05); *H04N 13/282* (2018.05); *H04N 2013/0085* (2013.01)

(56) References Cited

U.S. PATENT DOCUMENTS

| | | | | |
|---|---|---|---|---|
| 10,628,956 B2 * | 4/2020 | Ikeda | ................ | G06K 9/00771 |
| 10,659,769 B2 * | 5/2020 | Mizuno | ................ | G06T 15/20 |
| 10,705,678 B2 * | 7/2020 | Maruyama | ........... | H04N 5/2723 |
| 10,708,505 B2 * | 7/2020 | Taya | ................ | H04N 13/117 |
| 10,771,761 B2 * | 9/2020 | Mizuno | ................ | H04N 5/247 |
| 10,872,462 B2 * | 12/2020 | Nishiyama | ................ | G06T 3/40 |
| 10,917,621 B2 * | 2/2021 | Iwakiri | ................ | G06T 15/205 |
| 10,944,955 B2 * | 3/2021 | Koyama | ................ | H04N 5/222 |
| 10,944,960 B2 * | 3/2021 | Matsunobu | ........... | H04N 13/117 |
| 11,050,992 B2 * | 6/2021 | Sato | ................ | H04N 13/194 |
| 11,064,096 B2 * | 7/2021 | Sauermann | ........... | H04N 5/2228 |
| 11,132,837 B2 * | 9/2021 | Cordes | ................ | H04N 5/247 |
| 11,176,707 B2 * | 11/2021 | Koyama | ................ | G06T 7/246 |
| 2006/0119597 A1 * | 6/2006 | Oshino | ................ | H04N 13/243 |
| | | | | 345/418 |
| 2007/0103558 A1 | 5/2007 | Cai et al. | | |
| 2015/0363976 A1 * | 12/2015 | Henson | ................ | H04N 13/279 |
| | | | | 345/419 |
| 2016/0140733 A1 * | 5/2016 | Gu | ................ | H04N 13/172 |
| | | | | 348/43 |
| 2017/0171570 A1 * | 6/2017 | Mitsumoto | ........... | H04N 5/247 |
| 2019/0082160 A1 * | 3/2019 | Yano | ................ | H04N 13/111 |
| 2019/0174112 A1 * | 6/2019 | Adachi | ................ | H04N 13/139 |
| 2019/0182470 A1 * | 6/2019 | Mizuno | ................ | G06T 15/20 |
| 2019/0199992 A1 * | 6/2019 | Shikata | ................ | G06F 3/04815 |
| 2019/0253639 A1 * | 8/2019 | Takama | ................ | H04N 5/247 |
| 2019/0265876 A1 * | 8/2019 | Ishikawa | ................ | G06F 3/0486 |
| 2019/0356906 A1 * | 11/2019 | Handa | ................ | G06T 15/205 |
| 2020/0082603 A1 * | 3/2020 | Arai | ................ | H04N 5/23229 |
| 2020/0128230 A1 * | 4/2020 | Shikata | ................ | H04N 5/2224 |
| 2020/0275086 A1 * | 8/2020 | Ishikawa | ................ | H04N 13/282 |
| 2020/0311947 A1 * | 10/2020 | Handa | ................ | G06T 7/11 |
| 2020/0329227 A1 * | 10/2020 | Yoshimura | ........... | H04N 13/122 |
| 2020/0335020 A1 * | 10/2020 | Okutani | ................ | G06T 15/20 |
| 2021/0014425 A1 * | 1/2021 | Matsubayashi | ...... | H04N 5/2224 |
| 2021/0120224 A1 * | 4/2021 | Yoneda | ................ | H04N 21/4728 |
| 2021/0124965 A1 * | 4/2021 | Ishikawa | ................ | G06T 13/00 |
| 2021/0136349 A1 * | 5/2021 | Itakura | ................ | H04N 13/243 |
| 2021/0160473 A1 * | 5/2021 | Uemura | ................ | H04N 13/111 |

\* cited by examiner

FIG. 7

| RELATIONSHIP BETWEEN OBJECT AND VIRTUAL VIEWPOINT | 701 | 702 | 703 | 704 | 705 |
|---|---|---|---|---|---|
| INTERVAL OF UPDATING MATERIAL DATA | 1/60 s | 1/30 s | 1/30 s | 1/30 s | 1/60 s |
| INTERVAL OF UPDATING FRAME OF VIRTUAL VIEWPOINT IMAGE | 1/60 s | 1/60 s | 1/60 s | 1/60 s | 1/60 s |
| INTERVAL OF UPDATING VIRTUAL VIEWPOINT | 1/60 s | 1/30 s | 1/30 s | 1/30 s | 1/60 s |

FIG. 8

| | 801 | 802 | 803 | 804 | 805 |
|---|---|---|---|---|---|
| RELATIONSHIP BETWEEN OBJECT AND VIRTUAL VIEWPOINT | 801E 801A 801B 801D 801C | 802E 802A 802C 802B 802D | 803A 803C 803E 803D 803B | 804A 804C 804D 804E 804B | 805C 805A 805E 805B 805D |
| INTERVAL OF UPDATING MATERIAL DATA | 1/30 s | 1/30 s | 1/30 s | 1/30 s | 1/30 s |
| INTERVAL OF UPDATING FRAME OF VIRTUAL VIEWPOINT IMAGE | 1/60 s | 1/60 s | 1/60 s | 1/60 s | 1/60 s |
| ANGLE DIFFERENCE IN DIRECTION OF MOVEMENT BETWEEN VIRTUAL VIEWPOINT AND OBJECT | < THRESHOLD VALUE | ≥ THRESHOLD VALUE | ≥ THRESHOLD VALUE | < THRESHOLD VALUE | ≥ THRESHOLD VALUE |
| ANGLE DIFFERENCE BETWEEN DIRECTION OF MOVEMENT OF VIRTUAL VIEWPOINT AND LINE-OF-SIGHT DIRECTION | < THRESHOLD VALUE | ≥ THRESHOLD VALUE | ≥ THRESHOLD VALUE | ≥ THRESHOLD VALUE | ≥ THRESHOLD VALUE |
| INTERVAL OF UPDATING VIRTUAL VIEWPOINT | 1/60 s | 1/60 s | 1/60 s | 1/30 s | 1/60 s |

FIG. 9

| RELATIONSHIP BETWEEN OBJECT AND VIRTUAL VIEWPOINT | 901 | 902 | 903 | 904 | 905 |
|---|---|---|---|---|---|
| INTERVAL OF UPDATING MATERIAL DATA | 1/20 s | 1/20 s | 1/20 s | 1/20 s | 1/20 s |
| INTERVAL OF UPDATING FRAME OF VIRTUAL VIEWPOINT IMAGE | 1/60 s | 1/60 s | 1/60 s | 1/60 s | 1/60 s |
| SHAKING OF OBJECT | NOT FOUND | NOT FOUND | DETECTED IN THIRD FRAME | DETECTED IN SECOND FRAME | DETECTED IN THIRD FRAME |
| INTERVAL OF UPDATING VIRTUAL VIEWPOINT | 1/60 s | 1/60 s | 1/30 s | 1/20 s | 1/30 s |

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium, and more particularly to a technique for generating a virtual viewpoint image.

Description of the Related Art

In a known technique of generating a virtual viewpoint image, a plurality of image capturing apparatuses are disposed at different locations, and images are captured in synchronization. Using a plurality of captured images, a virtual viewpoint image is generated such that a point of view is allowed to be arbitrarily changed, More specifically, based on the plurality of captured images, three-dimensional shape data of an object included in the captured images is generated, and a virtual viewpoint image is generated by performing rendering on the three-dimensional shape data depending on a position of a virtual viewpoint and a direction in which the object is viewed from the virtual viewpoint.

Japanese Patent No. 6482498 discloses a technique of generating a variable-speed virtual viewpoint image such as a slow-motion virtual viewpoint image, a virtual viewpoint image whose viewpoint changes while stopping the progress of the imaging time, or the like.

To achieve generating such a variable-speed virtual viewpoint image, a plurality of frames of images for forming a virtual viewpoint moving image may be generated based on images captured at the same time point. For example, in a case where a virtual viewpoint moving image is generated which is to be reproduced at 60 fps (frames/second), two frames of virtual viewpoint images may be generated from each frame of the captured image captured at 60 fps, thereby generating a ½x-speed slow-motion virtual viewpoint image.

However, a virtual viewpoint image generated in such a manner has a problem that movement of an object in the virtual viewpoint image may be unnatural. For example, in a slow motion virtual viewpoint image, if the position of the object in the imaging region changes every two frames, while the position of the virtual viewpoint changes in every frame, then shaking or an unsmooth movement may occur on the object in the virtual viewpoint image. Such a problem may occur not only when a slow-motion virtual viewpoint image is generated but also when the frame rate of a captured image is lower than the frame rate of the virtual viewpoint image.

SUMMARY

According to one aspect of the present disclosure, there is provided an information processing apparatus comprising: a first acquisition unit configured to acquire update information indicating a predetermined frame update interval on a moving image at a virtual viewpoint that is reproduced by updating a virtual viewpoint image at the predetermined frame update interval, wherein the virtual viewpoint image is generated using i) multi-viewpoint images based on images captured, from a plurality of different positions, by a plurality of image capturing apparatuses, and ii) viewpoint information indicating a position of a virtual viewpoint and a direction from the virtual viewpoint; a second acquisition unit configured to acquire frame information of the multi-viewpoint images for use in generating the moving image, wherein the frame information includes information of a plurality of frames corresponding to different imaging times; and a generation unit configured to generate the viewpoint information based on the update information acquired by the first acquisition unit and the frame information acquired by the second acquisition unit, such that the viewpoint information indicating a position of the virtual viewpoint and a direction from the virtual viewpoint that is updated at an interval longer than the predetermined frame update interval is generated as the viewpoint information for the moving image that is generated using a smaller number of frames of multi-viewpoint images than the number of frames of virtual viewpoint images forming the moving image of a particular reproduction period.

Further features of the present disclosure will become apparent from the following description of exemplary embodiments with reference to the attached drawings.

BRIEF DESCRIPTION OF THE DRAWINGS

FIG. 7 is a diagram illustrating an example of control of an update interval of a virtual viewpoint, FIG. 8 is a diagram illustrating an example of control of an update interval of a virtual viewpoint, FIG. 9 is a diagram illustrating an example of control of an update interval of a virtual viewpoint.

DESCRIPTION OF THE EMBODIMENTS

System Configuration

Figure 1A:
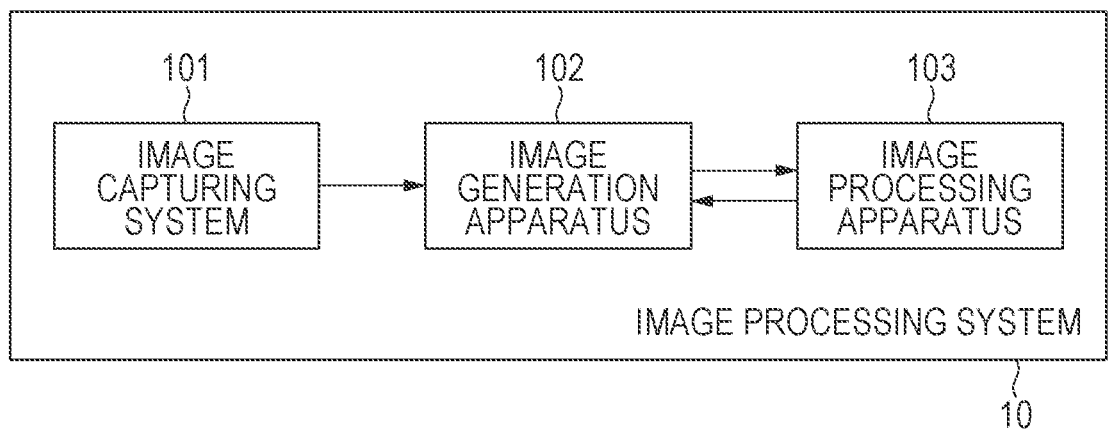
FIG. 1A and FIG. 1B are diagrams illustrating an example of a hardware configuration of an image processing system.

Embodiments of the present disclosure are described below with reference to drawings, FIG. 1A illustrates an example of a configuration of an image processing system 10. The image processing system 10 is a system that generates a virtual viewpoint image representing a view seen from a specified virtual viewpoint, based on a plurality of images (multi-viewpoint images) captured by a plurality of image capturing apparatuses and the specified virtual viewpoint. In the present embodiment, the virtual viewpoint image is also called a free viewpoint video image. Note that the virtual viewpoint image is not limited to an image viewed from a viewpoint which is freely (arbitrarily) specified by a user, but the virtual viewpoint image may be, for example, an image viewed from a viewpoint selected by a user from a plurality of candidates. In the following description of the present embodiment, it is assumed by way of example that the virtual viewpoint is specified via a specifying operation performed by a user, but the virtual viewpoint may be automatically specified based on a result of image analysis or the like. The image processing system 10 generates a virtual viewpoint moving image that is reproduced by updating a frame image forming a moving image given by a still virtual viewpoint image at a particular frame update interval. In the following description, the term "image" is used to describe both concepts of moving images and still images, unless otherwise specified.

The image processing system 10 includes an image capturing system 101, an image generation apparatus 102, and an information processing apparatus 103, The image capturing system 101 includes a plurality of image capturing apparatuses that capture images of a subject (an object) in an imaging region from a plurality of directions. The imaging region is, for example, a stadium where a game such as soccer, karate, or the like is played, or a stage where a concert or a play is held. The plurality of image capturing apparatuses are installed at different locations so as to surround such an imaging region, and capture images in synchronization. It should be noted that the plurality of image capturing apparatuses may not be installed over the entire circumference of the imaging region, and may be installed only in part of the periphery of the imaging region depending on a restriction on the installation location or the like. For example, when the imaging region is a soccer stadium, about 30 image capturing apparatuses may be installed around the stadium, although there is no particular restriction on the number of image capturing apparatuses. Furthermore, an image capturing apparatus having different functions such as a telephoto camera function, a wide-angle camera function, and/or the like may be installed. The image capturing system 101 outputs multi-viewpoint images based on images captured by the plurality of image capturing apparatuses to the image generation apparatus 102.

The image generation apparatus 102 generates a virtual viewpoint image based on the multi-viewpoint images acquired from the image capturing system 101 and the viewpoint information acquired from the information processing apparatus 103. The generation of the virtual viewpoint image is performed, for example, as follows. First, foreground images are acquired by extracting foreground areas corresponding to a particular object such as a person or a ball from multi-viewpoint images obtained by capturing images from different directions by the plurality of image capturing apparatuses, and background images are acquired by extracting background areas, that is, the remaining areas other than the foreground areas. Furthermore, a foreground model representing a three-dimensional shape of a particular object and texture data for coloring the foreground model are generated based on the foreground image, and texture data for coloring the background model representing a three-dimensional shape of the background such as a stadium is generated based on the background image. Then, the virtual viewpoint image is generated by mapping the texture data to the foreground model and the background model and performing rendering according to the virtual viewpoint indicated by the viewpoint information. However, the method of generating a virtual viewpoint image is not limited to that described above, and various methods may be employed. For example, a virtual viewpoint image may be generated by performing projective transformation on captured images without using a three-dimensional model.

The viewpoint information indicates the position of the virtual viewpoint and the view direction from the virtual viewpoint and is used in generating the virtual viewpoint image, More specifically, the viewpoint information has a set of parameters including parameters representing a three-dimensional position of the virtual viewpoint and parameters representing directions of the virtual viewpoint in terms of the pan, tilt, and roll directions, Note that the viewpoint information has a plurality of sets of parameters respectively corresponding to a plurality of time points. For example, the viewpoint information has a plurality of parameter sets for each of a plurality of frames forming a virtual viewpoint moving image wherein each set of parameters indicates the position of the virtual viewpoint and the view direction from the virtual viewpoint at each of a plurality of successive time points. The contents of the viewpoint information are not limited to those described above. For example, the parameter set of the viewpoint information may include a parameter indicating the size (angle of view) of the visual field of the virtual viewpoint and may include a parameter indicating time.

In the present embodiment, the term "virtual camera" is used. The virtual camera is a virtual camera that is different from the plurality of actual image capturing apparatuses installed around the image capturing area, and is a concept for expediently explaining a virtual viewpoint used in generation of a virtual viewpoint image. That is, the virtual viewpoint image can be regarded as an image captured from the virtual viewpoint defined in the virtual space corresponding to the imaging region. The position of the virtual viewpoint and the view direction from the virtual viewpoint in the virtual imaging can be represented as the position and direction of the virtual camera. In other words, the virtual viewpoint image is a simulated image which would be obtained if the image is captured by the camera located at the virtual viewpoint in the space. Furthermore, in the present embodiment, the term "virtual camera path" is used to describe contents of the transition of the virtual viewpoint with time. However, it is not essential to use the concept of the virtual camera to implement the present embodiment, That is, the present embodiment may be implemented by setting at least information indicating the specific position and the direction in the space, and by generating the virtual viewpoint image according to the set information.

The image generation apparatus 102 is capable of generating a live virtual viewpoint image by sequentially generating virtual viewpoint images based on the multi-viewpoint images acquired from the image capturing system 101, Note that the live virtual viewpoint image generated by the image processing system 10 is an image representing a scene in the imaging region a particular time before the present time due to a processing delay in the image capturing system 101 and the image generation apparatus 102. By storing the multi-viewpoint images acquired from the image capturing system 101 in the storage unit, it becomes possible for the image generation apparatus 102 to generate a virtual viewpoint image (a replay virtual viewpoint image) representing the situation of the imaging region at any past time.

The virtual viewpoint image generated by the image generation apparatus 102 is output to the information processing apparatus 103 and is displayed on the display unit 118 provided in the information processing apparatus 103. However, the output destination of the virtual viewpoint image is not limited to this. For example, the generated virtual viewpoint image may be output to a display apparatus (not shown) different from the information processing apparatus 103, or to a storage unit provided in the image generation apparatus 102 or an external storage apparatus (not shown). The image generation apparatus 102 may output the virtual viewpoint images such that the live virtual viewpoint image is output to a destination different from the destination to which the replay virtual viewpoint image is output. The image processing system 10 may include a plurality of information processing apparatuses 103, and each information processing apparatus 103 may be connected to the image generation apparatus 102 for communication.

Hardware Configuration

Figure 1B:
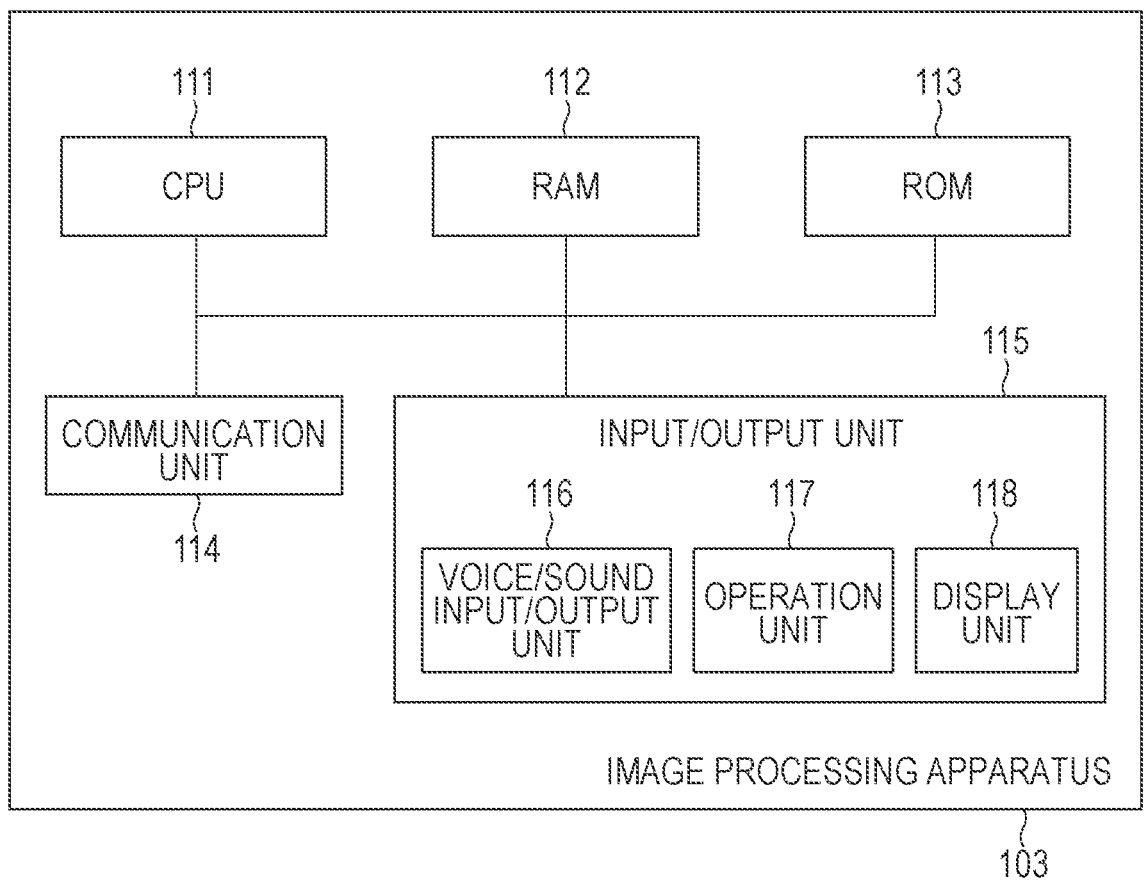

FIG. 1B illustrates an example of a hardware configuration of the information processing apparatus 103. Note that the hardware configuration of the image generation apparatus 102 is similar to the configuration of the information processing apparatus 103 described below. The information processing apparatus 103 includes a CPU 111, a RAM 112, a ROM 113, a communication unit 114, and an input output unit 115.

The CPU 111 controls the entire information processing apparatus 103 using a computer program and data stored in the RAM 112 and ROM 113, Note that the information processing apparatus 103 may include one or a plurality of dedicated hardware different from the CPU 111, and the dedicated hardware may execute at least part of the processing executed by the CPU 111, Examples of dedicated hardware include ASICs (application specific integrated circuits), FPGAs (field programmable gate arrays), GPUs (graphics processing units), and DSPs (digital signal processors). The RAM 112 temporarily stores the computer program read from the ROM 113, intermediate results of calculation, data supplied from the outside via the communication unit 114, and the like. The ROM 113 stores a computer program and data that do not need to be changed.

Figure 2:
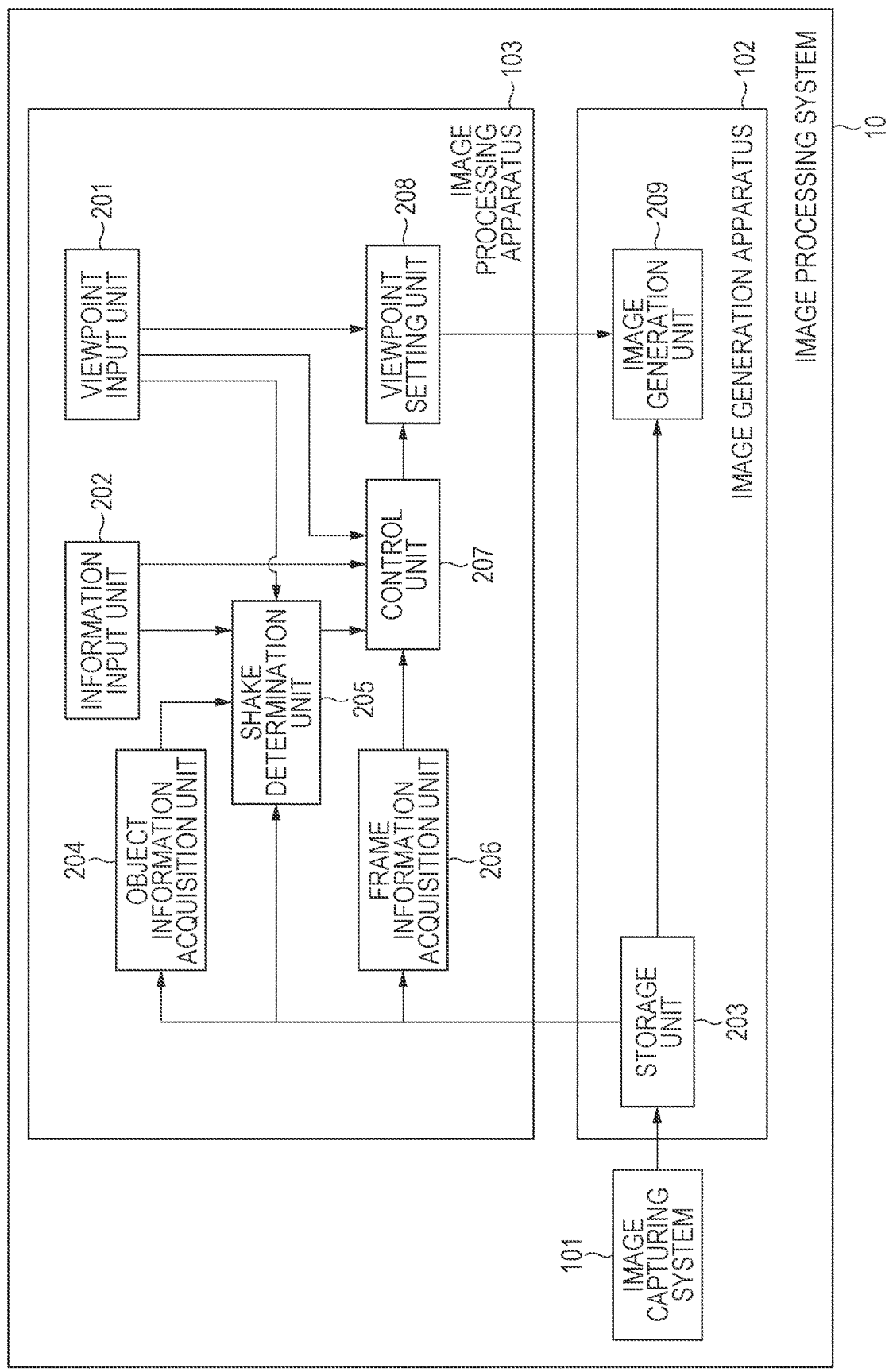
FIG. 2 is a diagram illustrating an example of a functional configuration of an image processing system.

The communication unit 114 has a communication interface for performing communication using Ethernet or USB, and communicates with an external apparatus such as the image generation apparatus 102. The input/output unit 115 includes a voice/sound input/output unit 116 such as a microphone that accepts voice/sound and a speaker that outputs voice/sound, an operation unit 117 such as a joystick, a mouse, a keyboard, and a touch panel, and a display unit 118 such as a liquid crystal display. The CPU 111 operates as a display control unit that controls the display unit 118 and an operation control unit that controls the operation unit 117. In the present embodiment, the display unit 118 and the operation unit 117 exist inside the information processing apparatus 103. However, at least one of the display unit 118 and the operation unit 117 may be provided outside the information processing apparatus 103, Functional Configuration FIG. 2 illustrates an example of a functional configuration of the image processing system 10, The viewpoint input unit 201 accepts an input for specifying a virtual viewpoint via the voice/sound input/output unit 116 and the operation unit 117, The input for specifying the virtual viewpoint is, for example, an input corresponding to a user operation on a joystick for moving the virtual viewpoint in a specific direction. Note that the viewpoint input unit 201 may accept an input of viewpoint information transmitted from an external apparatus or viewpoint information generated in the information processing apparatus 103. The viewpoint input unit 201 transmits information regarding a moving direction, a moving speed, a rotation direction, and rotation speed of the virtual viewpoint corresponding to the accepted input to the shake determination unit 205, the control unit 207, and a viewpoint setting unit 208.

The information input unit 202 accepts an input corresponding to a user operation via the voice/sound input/output unit 116 or the operation unit 117, and transmits control information corresponding to the input to the shake determination unit 205 and the control unit 207. The control information transmitted by the information input unit 202 is, for example, information specifying an update interval of a virtual viewpoint, which will be described later, or information indicating a shake of an object.

The storage unit 203 is a database that stores the multi-viewpoint images acquired from the image generation apparatus 102 and stores other material data. In the present embodiment, the term "material data" is used to describe data that is used in generating the virtual viewpoint image and that is generated based on an image captured by an image capturing apparatus, and data generated based on the captured image. Examples of material data generated based on a captured image are data of a foreground image and a background image extracted from the captured image, three-dimensional model data representing a shape of an object in a three-dimensional space, texture data for coloring a three-dimensional model, and the like. The multi-viewpoint image is one type of material data. The contents of the material data stored in the storage unit 203 are not limited to those described above.

In the present embodiment, it is assumed that the multi-viewpoint images transmitted from the image capturing system 101 are images captured by the plurality of image capturing apparatuses, and various kinds of material data are generated based on the multi-viewpoint images and stored in the storage unit 203, However, the multi-viewpoint images transmitted from the image capturing system 101 may be a plurality of foreground images obtained by extracting an area corresponding to a particular object from the plurality of captured images acquired by the plurality of image capturing apparatuses, That is, the process of extracting the foreground images from the captured images may be performed by the image capturing system 101 or the image generation apparatus 102.

The object information acquisition unit 204 acquires information related to a particular object from the material data stored in the storage unit 203, and transmits the acquired information to the shake determination unit 205. The shake determination unit 205 acquires at least one of the virtual viewpoint information output from the viewpoint input unit 201, the control information output from the information input unit 202, the material data stored in the storage unit 203, and the information output from object information acquisition unit 204. Then, the shake determination unit 205 makes a determination, based on the acquired information, as to whether shaking of the object in the virtual viewpoint image occurs, and transmits a determination result to the control unit 207.

For example, when the shake determination unit 205 acquires control information indicating that a shake suppression operation is performed, the shake determination unit 205 may determine that shaking occurs. In an alternative example, the shake determination unit 205 may calculate the position of the object in the virtual viewpoint image based on the position of the object in the three-dimensional space indicated by the object information, and may determine the occurrence of shaking based on a change in the position. Alternatively, for example, the shake determination unit 205 may generate a simple virtual viewpoint image based on the material data, and may calculate a motion vector of the object in each frame of the virtual viewpoint image thereby determining an occurrence of a shake. More specifically, when a motion vector different in direction from that in a previous or following frame is detected in calculation, or when a motion vector with a magnitude greater than a predetermined value is detected in calculation, the shake determination unit 205 may determine that shaking occurs on the object. Alternatively, the shake determination unit 205 may store in advance data indicating a dependence of an occurrence of shaking on a movement of an object and a movement of a virtual viewpoint, may determine based on the data whether or not shaking of the object occurs. Note that the method of determining, by the shake determination unit 205, whether or not shaking occurs is not limited to the examples described above.

The frame information acquisition unit 206 acquires information regarding the frame rate of the material data stored in the storage unit 203, and transmits the acquired information to the control unit 207. The control unit 207 determines the update interval of the virtual viewpoint in the operation of generating the virtual viewpoint image based on the information acquired from at least one of the functional units of the information processing apparatus 103 described above, and transmits the determined information indicating the update interval to the viewpoint setting unit 208. The viewpoint setting unit 208 generates viewpoint information indicating the position of the virtual viewpoint and the view direction from the virtual viewpoint based on the virtual viewpoint information acquired from the viewpoint input unit 201 and the information on the update interval of the virtual viewpoint acquired from the control unit 207, and outputs the generated viewpoint information to the image generation unit 209. The image generation unit 209 generates a virtual viewpoint image based on the material data acquired from the storage unit 203 and the viewpoint information acquired from the viewpoint setting unit 208.

The configuration of the image processing system 10 is not limited to that shown in FIG. 2, For example, some of the components of the information processing apparatus 103 illustrated in FIG. 2 may be implemented in another apparatus that can communicate with the information processing apparatus 103. Furthermore, for example, the image generation apparatus 102 and the information processing apparatus 103 may be integrated into one piece.

Effects of Controlling the Update Interval of Virtual Viewpoints

Effects obtained by controlling the update interval of the virtual viewpoint according to the present embodiment are described below with reference to FIGS. 6A and 6B. When a slow-motion virtual viewpoint image or the like is generated, the frame update interval of the virtual viewpoint image may be different from the update interval of the material data used in generating the virtual viewpoint image. Let it be assumed here by way of example in the following discussion that the frame rate of the virtual viewpoint image is 60 fps and the frame rate of the material data such as the multi-viewpoint images is also 60 fps. When a ½× slow motion virtual viewpoint image is generated using the material data described above, two frames of virtual viewpoint images are generated from one frame of material data, and thus 30 frames of material data are used to generate one second of virtual viewpoint image. That is, the frame update interval at which the frame of the virtual viewpoint image is switched is 1/60 seconds, while the update interval of the material data at which the material data used is switched is 1/30 seconds. In this case, if the update interval of the virtual viewpoint at which the position of the virtual viewpoint and the view direction from the virtual viewpoint in the operation of generating the virtual viewpoint image are updated is matched with the frame update interval of the virtual viewpoint image, the update interval of the virtual viewpoint and the update interval of the material data are different. As a result, the position of the object in the virtual viewpoint image may shake or stagger depending on the movement of the object or the virtual viewpoint.

Figure 6A:
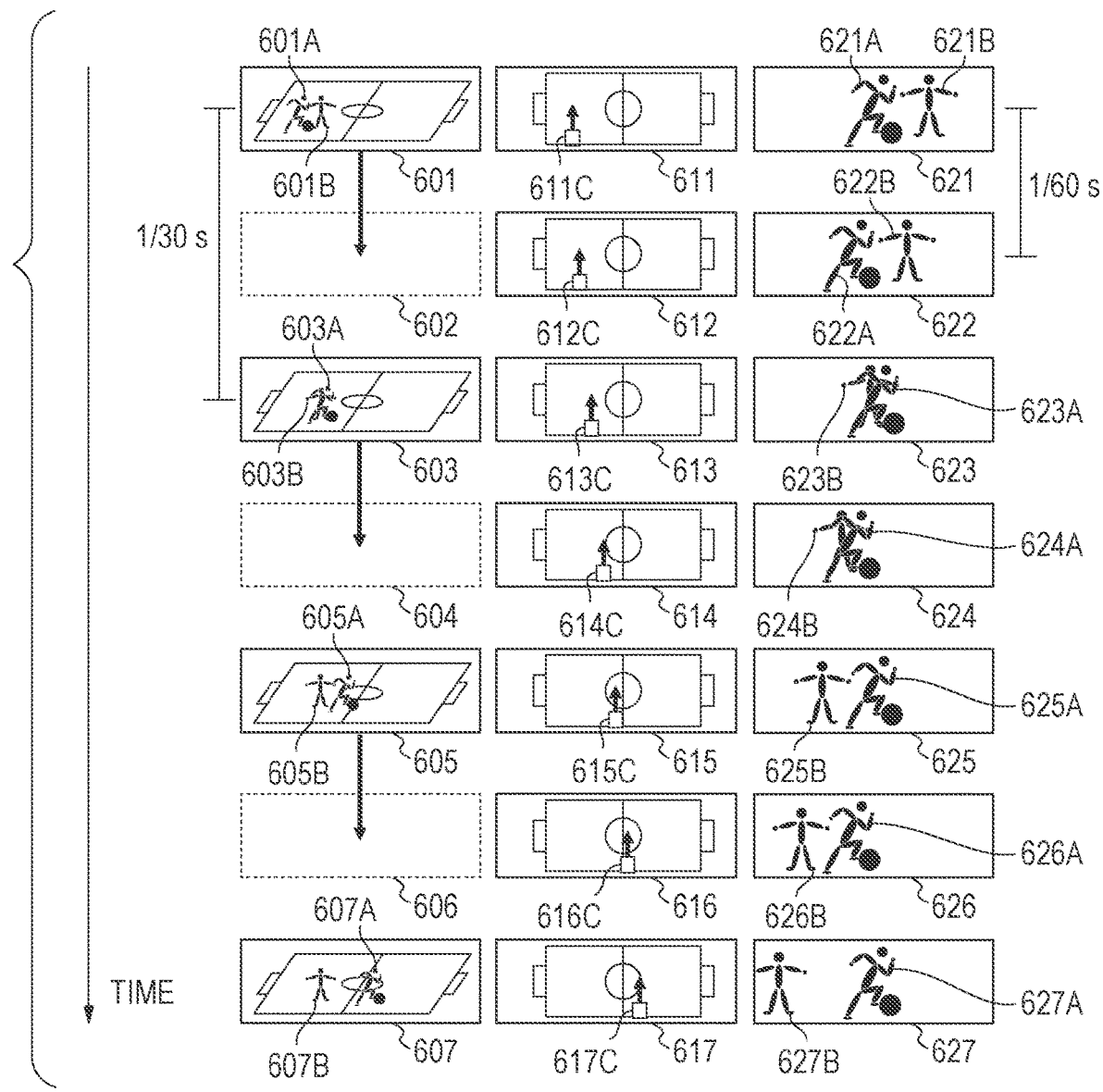
FIG. 6A and FIG. 6B are diagrams illustrating an effect obtained by controlling an update interval of a virtual viewpoint.

FIG. 6A illustrates an example in which a slow-motion virtual viewpoint image with 60 fps is generated by generating two frames of virtual viewpoint image from one frame of material data. In this example, the material data used is updated every 1/30 second, and the virtual viewpoint (the virtual camera) is updated every 1/60 second. In a field of an imaging area captured by the image capturing system 101, players A and B are captured. The player A is moving to the right while carrying a ball. The player B is in a stationary state. The virtual camera C is moving to the right such that that the player A is captured at the center of the image. A vertical axis represents time. One row corresponds to one frame of the virtual viewpoint image. For example, a block 601 illustrates a state of an object represented by material data at a time corresponding to a first frame, a block 613 illustrates a position and a direction of a virtual camera at a time corresponding to a third frame, and block 623 illustrates a virtual viewpoint image of a third frame.

According to the player A (601A), the player B (601B), and the virtual camera C (611C) at the timing of the first frame, a virtual viewpoint image is generated such that the player A (621) appears in the center of the screen as shown in block 621. At the timing of the second frame, the position of the virtual camera is updated, but the material data is not updated. It is supposed that at the timing of the second frame, the player A is to appear in the center of the visual field of the virtual camera C (612C), However, the material data used here is that used at the timing of the first frame, that is, the material data representing the player A (601A) one frame before is used. The result of this is that, as shown in block 622, the virtual viewpoint image is generated such that the player A (622A) appears at a position displaced leftward from the center of the screen.

Two types of frames appear alternately. In a first type, both the position of the virtual camera and the material data are updated, while in a second type, although the position of the virtual camera is updated, the material data is not updated. Thus, in a series of virtual viewpoint images (621, 622, 623, 624, 625, 626, 627) n FIG. 6A, the position of the player A displayed on the screen alternately changes between the center of the screen and a position shifted to left from the center, and thus the position shakes. On the other hand, the position of the player B simply moves from right to left in the screen, and no shaking occurs for the player B.

Such a phenomenon in which a displayed object shakes on the screen tends to be easily recognized by a user particularly in a situation where the object and the virtual camera move side by side as in the example in FIG. 6A. In such a case, the generated virtual viewpoint image may be unnatural, Such a problem may occur not only in a case where a slow-motion virtual viewpoint image is generated, but also in a case where the frame rate at which the image capturing system 101 captures an image is lower than the frame rate of the virtual viewpoint image.

Figure 6B:
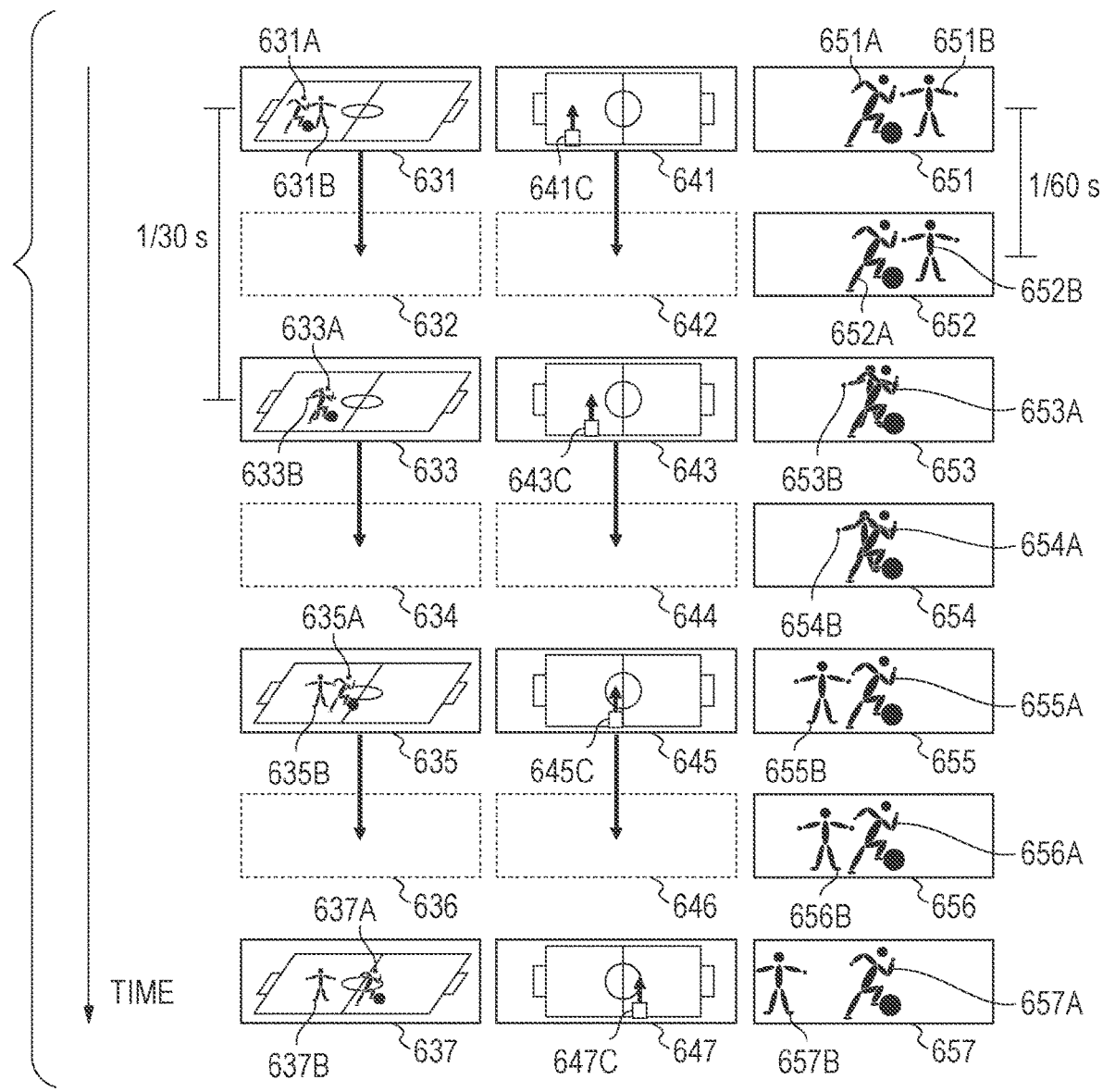

FIG. 6B illustrates another example in which slow-motion virtual viewpoint image with 60 fps is also generated by generating two virtual viewpoint image frames from one material data frame as in the example shown in FIG. 6A. However, in this example, the update interval of the virtual viewpoint is set to 1/30 seconds. Also in this example, as in the example shown in FIG. 6A, a player A moving while carrying a ball and a player B remaining stationary at a location are captured by a virtual camera C which moves side by side with the player A such that the player A is captured at the center of the image.

At the timing of a first frame, the virtual viewpoint image is generated according to the positions of the player A (631), the player B (631B), and the virtual camera C (641C) such that the player A (631A) appears in the center of the screen as shown in block 651. At the timing of a second frame, neither the position of the virtual camera nor the material data is updated, Thus, in this case, the virtual viewpoint image is generated using the viewpoint information related to the virtual camera C (641C) of one frame before and the material data representing the player A (631A) of one frame before. In the resultant generated virtual viewpoint image, the player A 652A) appears at the center of the screen as shown in block 652.

Figure 3:
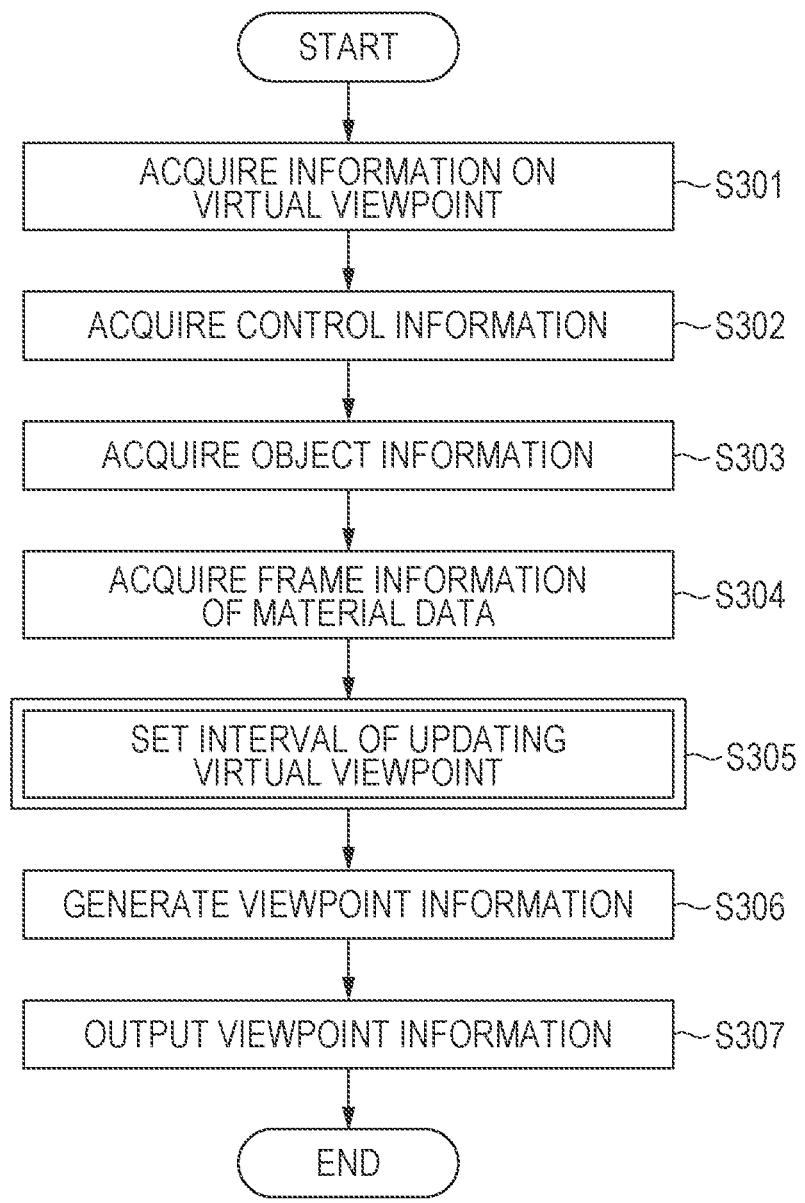
FIG. 3 is a flowchart illustrating an example of an operation of an information processing apparatus.

Two types of frames appear alternately. In a first type, both the position of the virtual camera and the material data are updated, while in a second type, neither the position of the virtual camera and nor the material data is updated. Thus, in a series of virtual viewpoint images (651, 652, 653, 654, 655, 656, 65) in FIG. 6B, the position of the player A is always displayed in the center of the screen, and no shaking occurs on the player A. As for the player B, its position moves in one direction from right to left on the screen, no shaking occurs on the player B, As described above, by appropriately controlling the update interval of the virtual viewpoint according to the method of the present embodiment, it is possible to reduce occurrences of shaking on the object in the virtual viewpoint image, Operation Flow FIG. 3 is a flowchart illustrating an example of an operation of the information processing apparatus 103, Processing illustrated in FIG. 3 is realized by the CPU 111 of the information processing apparatus 103 by loading a program stored in the ROM 113 into the RAM 112 and executing it. Note that at least a part of the processing illustrated in FIG. 3 may be realized by one or a plurality of dedicated hardware units different from the CPU 111. The process illustrated in FIG. 3 is started at a timing when the image generation apparatus 102 and the information processing apparatus 103 are connected to each other, and an instruction for specifying a viewpoint of a virtual viewpoint image to be generated is input to the information processing apparatus 103, However, the timing of starting the process shown in FIG. 3 is not limited to the example described above. In the following description with reference to FIG. 3, it is assumed that a replay virtual viewpoint image is generated based on the material data stored in advance in the storage unit 203, and the process shown in FIG. 3 is executed for each image in a series of virtual viewpoint images corresponding to a series of virtual camera paths.

In S301, the viewpoint input unit 201 acquires information regarding the moving direction, moving speed, rotation direction, rotation speed, and the like, of the virtual viewpoint based on the input given via the voice/sound input/output unit 116 or the operation unit 117, In S302, the information input unit 202 acquires control information according to a user operation or the like. The control information acquired here is, for example, information specifying an update interval of a virtual viewpoint, which will be described later, or information indicating shaking of an object. Here, the control information acquired in S302 may include information indicating a frame update interval of a virtual viewpoint image on a reproduction of a moving image at a virtual viewpoint. A frame update interval of a virtual viewpoint image may be specified in accordance with a user operation or may be set to be a predetermined interval in advance. Also, a frame update interval of a virtual viewpoint image may be determined in accordance with a band of a communication path that is used for a transmission of a moving image at a virtual viewpoint or an ability of a display apparatus that is used for displaying a moving image at a virtual viewpoint. In S303, the object information acquisition unit 204 acquires object information regarding the position and/or movement of the object based on the material data stored in the storage unit 203, In step S304, the frame information acquisition unit 206 acquires frame information regarding the frame rate or the like of the material data based on the material data stored in the storage unit 203.

The frame information acquired by the frame information acquisition unit 206 includes information indicating the frame rate of the multi-viewpoint images. In the present embodiment, it is assumed that the frame rates are equal among the imaging frame rate of the image capturing system 101, the frame rate of the multi-viewpoint images stored in the storage unit 203, and the frame rate of the material data such as model data stored in the storage unit 203. However, there may be difference among the above-described frame rates. For example, the frame rates may be different among some material data stored in the storage unit 203. In this case, the frame information acquisition unit 206 may acquire frame information indicating the frame rate of each material data. Note that the frame information only needs to include information on a plurality of frames corresponding to different imaging times captured by the image capturing system 101 for acquiring a multi-viewpoint image, and the contents of the frame information are not limited to those described above. For example, the frame information may be information indicating a frame update interval of the multi-viewpoint image, or information indicating the number of frames of the multi-viewpoint image, or a information indicating times corresponding to respective frames of the multi-viewpoint images.

In S305, the control unit 207 determines the update interval of the virtual viewpoint in generating the virtual viewpoint images, based on various information acquired via the processes from S301 to S304. The process in S305 will be described in detail later with reference to FIG. 4.

The order of performing the processes S301 to S304 is not limited to that shown in FIG. 3. Note that at least part of the processes from S301 to S304 may be performed in parallel. Furthermore, the information processing apparatus 103 may not execute at least some of the processes from S301 to S304. For example, in a case where only frame information acquired in S304 is used in the setting of the virtual viewpoint in S305, the processes from S301 to S303 may be omitted.

In S306, the viewpoint setting unit 208 generates viewpoint information according to the update interval determined in S305, The viewpoint information according to the determined update interval indicates a position of the virtual viewpoint and a view direction from the virtual viewpoint at each of a plurality of time points according to the determined update interval. More specifically, in a case viewpoint information is generated for the update interval of the virtual viewpoint determined as $\frac{1}{30}$ seconds, the resultant viewpoint information includes 30 sets of parameters indicating the position of the virtual viewpoint and the view direction from the virtual viewpoint per second. However, the format of the viewpoint information is not limited to this example. For example, the viewpoint information according to the determined update interval may indicate the position of the virtual viewpoint and the view direction from the virtual viewpoint at each of a plurality of time points according to the frame update interval of the virtual viewpoint image, More specifically, when the frame update interval of the virtual viewpoint image is $\frac{1}{60}$ seconds, the viewpoint information may be generated so as to include 60 sets of parameters indicating the position of the virtual viewpoint and the view direction from the virtual viewpoint per second. In this format, when the update interval of the virtual viewpoint is 1/30 seconds, identical two parameter sets are placed in every two intervals in the viewpoint information. In the present embodiment, the following description focuses on a case where the update interval of the virtual viewpoint is equal to or longer than the frame update interval of the virtual viewpoint image. This is by way of example but not limitation. The update interval of the virtual viewpoint may be shorter than the frame update interval of the virtual viewpoint image.

In S307, the viewpoint setting unit 208 outputs the viewpoint information generated in S306 to the image generation unit 209 of the image generation apparatus 102. The image generation unit 209 generates a virtual viewpoint image according to the viewpoint information acquired from the viewpoint setting unit 208, based on the material data acquired from the storage unit 203.

Figure 4:
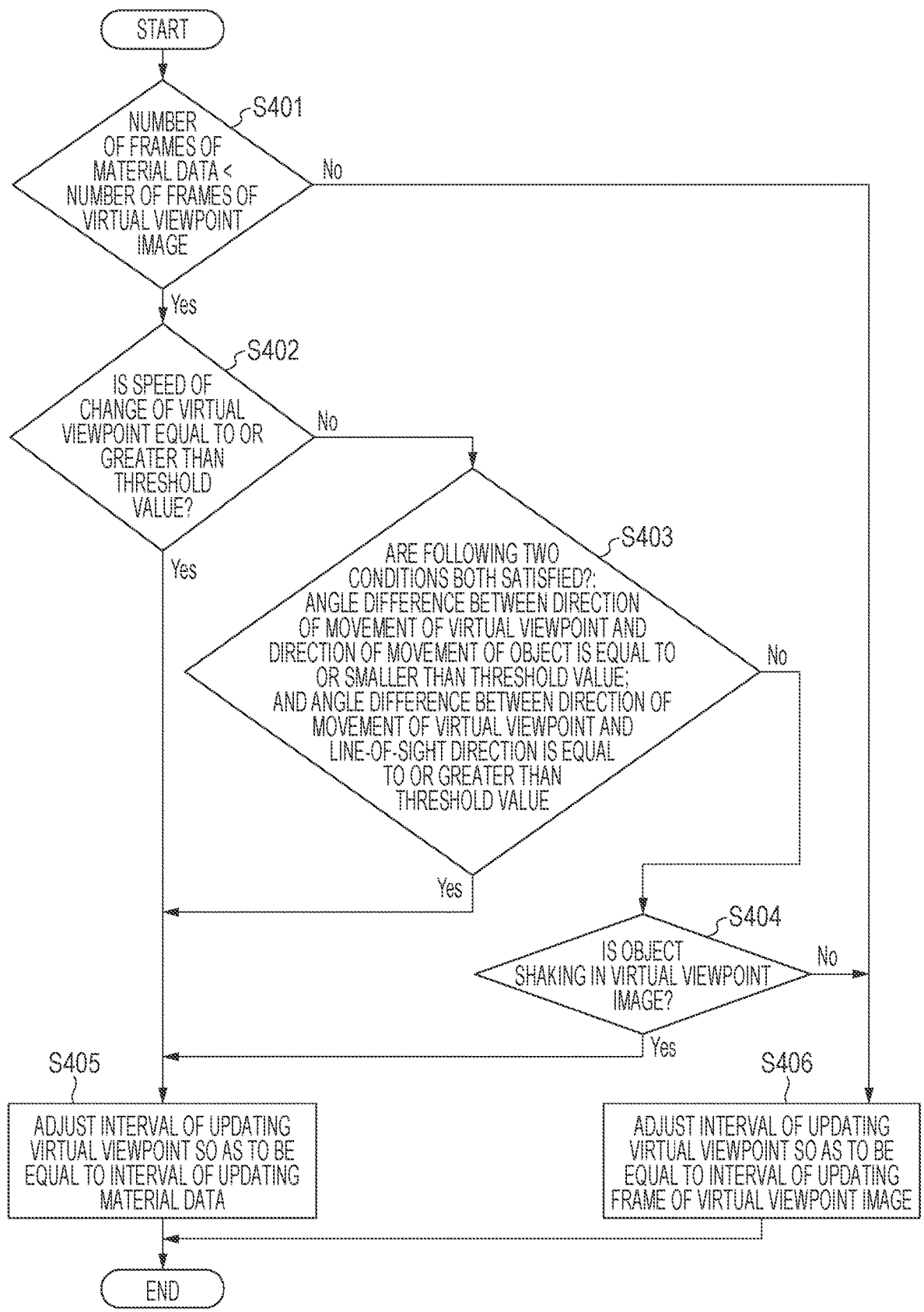
FIG. 4 is a flowchart illustrating an example of a method of determining an update interval of a virtual viewpoint.

The process in S305 is described in detail below with reference to FIG. 4. FIG. 4 is a flowchart illustrating an example of the process in S305 in FIG. 3, Note that the process shown in FIG. 4 is executed for each particular period (for example, for each one second of virtual camera path) in a series of virtual camera paths that are to be subjected to the process shown in FIG. 3. That is, the information processing apparatus 103 controls the update interval of the virtual viewpoint in the virtual camera path represented by the viewpoint information generated in S306 for each particular period. However, the information processing apparatus 103 may determine the update intervals of the virtual viewpoints so as to be constant for the entire series of virtual camera paths subjected to the process shown in FIG. 3.

In step S401, the control unit 207 compares the number of frames of virtual viewpoint image forming a moving image of a predetermined reproduction period with the number of frames of material data used in generating the virtual viewpoint image corresponding to the predetermined reproduction period. In the present embodiment, it is assumed that the number of frames of material data is given by the number of frames of a multi-viewpoint image. However, this is by way of example and not limitation. For example, the number of frames of material data may be given by the number of frames of the three-dimensional model data. In a case where it is determined in S401 that the number of frames of the material data is smaller than the number of frames of the virtual viewpoint image, the processing flow proceeds to S402, but otherwise the processing flow proceeds to S406.

For example, it is assumed here that the frame rate of the virtual viewpoint image (the number of frames in the reproduction period of 1 second) is 60 fps, and the frame rate of the material data of the multi-viewpoint image or the like is also 60 fps. In a case where this material data is used in generating a virtual viewpoint image of a normal speed, 60 frames of material data are used to generate one second of virtual viewpoint image including 60 frames, and thus the determination in S401 is NO. Thus, the processing flow proceeds to S406. On the other hand, in a case where a ½× slow-motion virtual viewpoint image is generated, two frames of the virtual viewpoint image are generated from one frame of material data. That is, 30 frames of material data are used to generate a 1-second virtual viewpoint image consisting of 60 frames. Therefore, the determination in S401 is YES, and the processing flow proceeds to S402.

In S402, the control unit 207 determines whether the virtual viewpoint changes at a speed equal to or higher than a predetermined value, based on the information on the virtual viewpoint obtained via the viewpoint input unit 201. The speed of the change of the virtual viewpoint is, for example, one of the following: the moving speed of the virtual viewpoint; the rotation speed of the virtual viewpoint; and a combination of the moving speed and the rotation speed. If it is determined in S402 that the speed of the change of the virtual viewpoint is equal to or greater than a threshold value, the processing flow proceeds to S405, but otherwise the processing flow proceeds to S403.

In S403, the control unit 207 determines whether or not a predetermined condition is satisfied, based on the object information obtained from the object information acquisition unit 204. More specifically, the determination is made as to whether the angle difference between the moving direction of the virtual viewpoint and the moving direction of the object in the three-dimensional space is smaller than a threshold value, and furthermore the angle difference between the moving direction of the virtual viewpoint and the view direction of the virtual viewpoint (the direction of the line-of-sight) is equal to or greater than a threshold value. If the determination result is YES, the processing flow proceeds to S405, but otherwise the processing flow proceeds to S404.

In step S404, based on the information obtained from the shake determination unit 205, the control unit 207 determines whether shaking occurs on the object if the virtual viewpoint update interval is set to be equal to a predetermined length (for example, the frame update interval of the virtual viewpoint image). If the result of the determination in S404 is YES, the processing flow proceeds to S405, but otherwise the processing flow proceeds to S406.

In the case where the processing flow proceeds to S405, that is, in the case where it is determined that shaking may occur on the object in the virtual viewpoint image or shaking has been detected, the control unit 207 determines the virtual viewpoint image update interval so as to be equal to the update interval of material data used in generating the virtual viewpoint image. On the other hand, in the case where the processing flow proceeds to S406, the control unit 207 determines the update interval of the virtual viewpoint so as to be equal to the frame update interval of the virtual viewpoint image.

Note that the method of determining the update interval of the virtual viewpoint shown in FIG. 4 is merely an example. That is, the method of determining the update interval of the virtual viewpoint by the control unit 207 is not limited to this example. For example, the order of the condition determinations from S401 to S404 may be exchanged, or at least one of the condition determinations from S401 to S404 may be omitted. More specifically, for example, in the case where the result of the determination in S401 is YES, the processing flow may proceed to S405, and otherwise the processing flow may proceed to S406. Furthermore, for example, the control unit 207 may determine whether the process in S405 or the process in S406 is performed based on whether the conditions regarding the position and height of the virtual viewpoint in the three-dimensional space, the moving path, and the moving speed of the object are satisfied or not.

In the example shown in FIG. 4, when the number of frames of material data used in generating the virtual viewpoint image of a predetermined reproduction period is equal to or more than the number of frames of virtual viewpoint image in this reproduction period, the update interval of the virtual viewpoint is set to be equal to the frame update interval of the virtual viewpoint image. Also in a case where the number of frames of material data used in generating the virtual viewpoint image of the predetermined reproduction period is smaller than a predetermined threshold value, the update interval of the virtual viewpoint may be set to be equal to the frame update interval of the virtual viewpoint image. That is, in a case where the ratio is in a predetermined range between the number of frames of the material data used in generating the virtual viewpoint image of the predetermined reproduction period and the number of frames of the virtual viewpoint image of this reproduction period, the update interval of the virtual viewpoint may be set to be equal to the update interval of the material data. If this condition is not satisfied, the virtual viewpoint update interval may be set to be equal to the frame update interval of the virtual viewpoint image. This makes it possible to prevent the virtual viewpoint update interval from being too large or to prevent the interval from not being updated when a slow motion virtual viewpoint image with a very low motion speed is generated, or a virtual viewpoint image is generated such that the virtual viewpoint changes in a state in which the progress of the imaging time is stopped.

Figure 5:
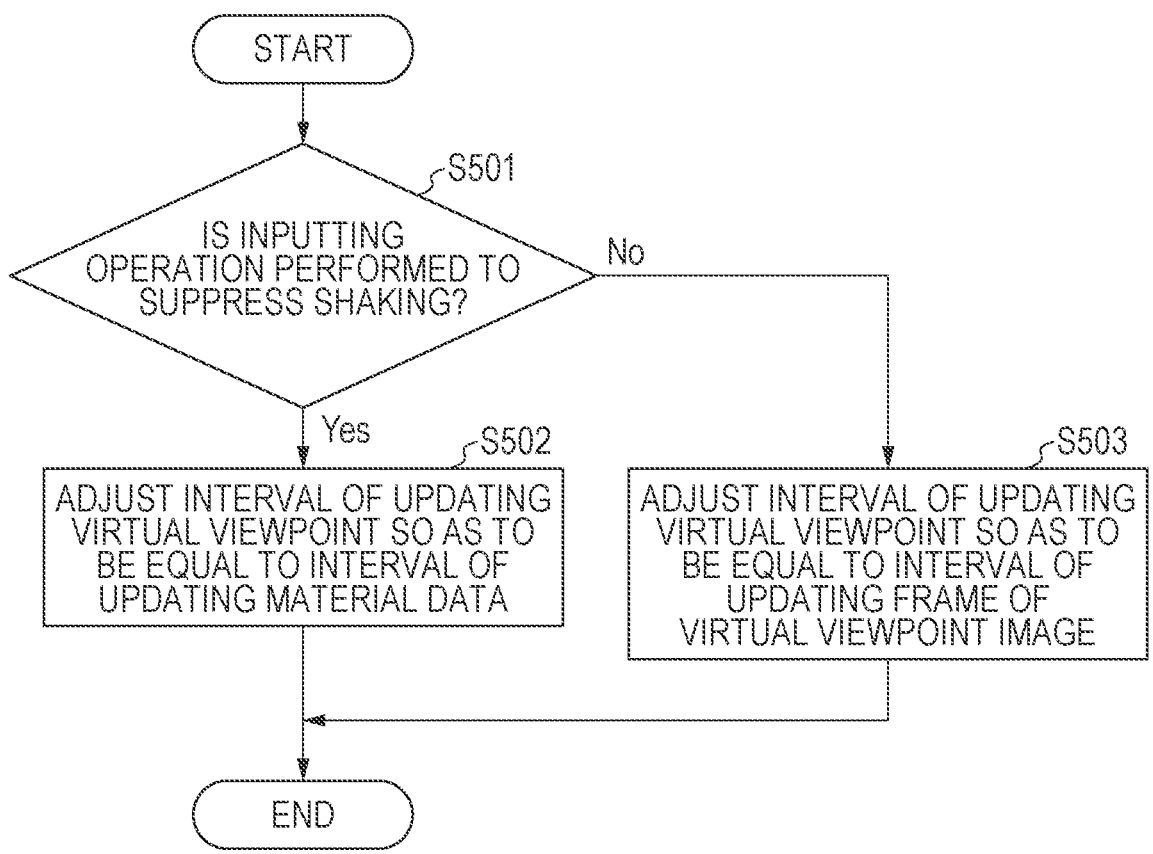
FIG. 5 is a flowchart illustrating an example of a method of determining an update interval of a virtual viewpoint.

The update interval of the virtual viewpoint may be determined based on a user operation. FIG. 5 is a flowchart illustrating an example of the process in S305 in FIG. 3, different from the example shown in FIG. 4. In S501, the information input unit 202 determines whether or not a shake suppression operation has been input which instructs to suppress shaking of the object in the virtual viewpoint image. For example, when a particular button is pressed by a user in response to recognizing that shaking is occurring or a particular button is pressed by a user to instruct to prevent blurring, the information input unit 202 determines that the shake suppression operation is performed. In a case where inputting of the shake suppression operation is performed, the processing flow proceeds to step S502 in which the control unit 207 sets the update interval of the virtual viewpoint to be equal to the update interval of the material data. On the other hand, in a case where inputting of the shake suppression operation is not performed, the processing flow proceeds to S503 in which the control unit 207 sets the virtual viewpoint update interval to be equal to the frame update interval of the virtual viewpoint image. Note that in a case where inputting of the shake suppression operation has been once performed, the control unit 207 may continuously perform the process in S502. Alternatively, the process in S502 may be performed only for a period in which the instruction given by the shake suppression operation is effective, but the process in S503 may be performed when the instruction given by the shake suppression operation becomes ineffective.

Note that the update interval of the virtual viewpoint may be different from the frame update interval of the virtual viewpoint image and different from the material data update interval. For example, when the update interval of the material data is longer than the frame update interval of the virtual viewpoint image, the control unit 207 may set the update interval of the virtual viewpoint to a length between the frame update interval of the virtual viewpoint image and the update interval of the material data.

The operation flow of the information processing apparatus 103 has been described above. As described above, the information processing apparatus 103 according to the present embodiment generates viewpoint image indicating the position of the virtual viewpoint and the view direction from the virtual viewpoint related to the virtual viewpoint image generated based on multi-viewpoint images captured by a plurality of image capturing apparatuses configured to capture images of an object from a plurality of directions. In this process, depending on whether a predetermined condition is satisfied or not, the information processing apparatus 103 sets the update interval of the position of the virtual viewpoint and the view direction from the virtual viewpoint related to the generation of the virtual viewpoint image to be longer than the frame update interval of the virtual viewpoint image, and generates the viewpoint information according to the determined update interval. According to the embodiment described above, it is possible to suppress the occurrence of unnatural shaking or unsmooth movement of an object in a virtual viewpoint image even when a variable-speed virtual viewpoint image such as a slow-motion virtual viewpoint image is generated.

Three specific examples of the control of the virtual viewpoint update interval by the information processing apparatus 103 are described with reference to FIGS. 7 to 9. In a first example shown in FIG. 7, the update interval of the virtual viewpoint is controlled based on the update interval of the material data. In a second example shown in FIG. 8, the update interval of the virtual viewpoint is controlled based on a manner in which the virtual viewpoint and the object move. In a third example shown in FIG. 9, the update interval of the virtual viewpoint is controlled based on a result of a determination as to whether shaking of an object occurs.

First, with reference to FIG. 7, the example is described in which the control unit 207 controls update interval of the virtual viewpoint based on the frame information on the material data acquired from the frame information acquisition unit 206 and based on the frame rate information of the virtual viewpoint image to be generated by the image generation unit 209. More specifically, when the frame update interval of the virtual viewpoint image is smaller than the update interval of the material data, control is performed such that the update interval of the virtual viewpoint is equal to the update interval of the material data.

In FIG. 7, each point (701, 702, 703, 704, 705) on a time axis represents not a specific time point but a time slot having a length corresponding to several frames or more, Note that a period from point 701 to point 705 is a continuous single period. In FIG. 7, "relationship between object and virtual viewpoint" shows a manner in which an object (701A, 702A, 703A, 704A, 705A) and a virtual viewpoint (701B, 702B, 703B, 704B, 705B) change from one time slot to next, A solid arrow (701C, 702C, 703C, 704C, 705C) extending from the object indicates the moving direction of the object, and a solid arrow (701D, 702D, 703D, 704D, 705D) extending from the virtual viewpoint indicates the moving direction of the virtual viewpoint. A region (701E, 702E, 703E, 704E, 705E) between two line segments extending from the virtual viewpoint indicates the direction and the angle of view of the virtual viewpoint.

A description is given below as to a manner in which the update interval of the virtual viewpoint related to the generation of the virtual viewpoint image is controlled in each time slot. In a time slot 701, the object 701A and the virtual viewpoint 701B move in parallel at the same speed. The material data update interval is ⅟60 second, the frame update interval of the virtual viewpoint image is ⅟60 second, and update interval of the virtual viewpoint is equal to the update interval of virtual viewpoint image, that is, ⅟60 second.

From a time slot 702 to a time slot 704, the object (702A, 703A, 704A) and the virtual viewpoint (702B, 703B, 704B) move in parallel at the same speed. In these time slots, the virtual viewpoint image is in slow motion, and the update interval of the material data is set to a longer value ⅟30 second. On the other hand, the frame update interval of the virtual viewpoint image is 1/60 second, and thus the frame update interval of the virtual viewpoint is shorter than the update interval of the material data. Thus, the control unit 207 sets the update interval of the virtual viewpoint to be equal to the update interval of the material data, that is, 1/30 second.

In a time slot 705, the object 705A and the virtual viewpoint 705B move in parallel at the same speed. In this time slot, the display speed of the virtual viewpoint image has returned to a normal speed from the slow-motion speed, and thus the update interval of the material data is 1/60 seconds, and the update interval of the virtual viewpoint image is 1/60 seconds, Thus, the control unit 207 sets the update interval of the virtual viewpoint to be equal to the frame update interval of the virtual viewpoint image, that is, 1/60 seconds.

Next, referring to FIG. 8, the example is descried in which the control unit 207 controls the update interval of the virtual viewpoint based on the virtual viewpoint information acquired from the viewpoint input unit 201 and the object information acquired from the object information acquisition unit 204, More specifically, when the angle difference between the moving direction of the virtual viewpoint and the moving direction of the object is smaller than the threshold value, and furthermore the angle difference between the moving direction of the virtual viewpoint and the position of the virtual viewpoint and the view direction from the virtual viewpoint is equal to or greater than the threshold value, the update interval of the virtual viewpoint is controlled so as to be equal to the update interval of the material data, Here, it is assumed that the threshold value for the angle difference between the moving direction of the virtual viewpoint and the moving direction of the object is 15 degrees, and the threshold value for the angle difference between the moving direction of the virtual viewpoint and the view direction from the virtual viewpoint is 30 degrees.

The virtual viewpoint image is in slow-motion continuously from a time slot 801 to a time slot 805, and the update interval of the material data is 1/30 second. In the time slot 801, the virtual viewpoint 801B moves at the same speed of the object 801A so as to follow the object 801A. The angle difference between the moving direction 801D of the virtual viewpoint and the moving direction 801C of the object is smaller than the threshold value, and the angle difference between the moving direction 801D of the virtual viewpoint and the direction 801E of the virtual viewpoint is smaller than the threshold value. In this case, the condition that the angle difference between the moving direction 801D of the virtual viewpoint and the direction 801E of the virtual viewpoint is equal to or greater than the threshold is not satisfied. Therefore, the update interval of the virtual viewpoint is equal to the frame update interval of the virtual viewpoint image, that is, 1/60 seconds.

In time slots 802 and 803, the virtual viewpoint (802B, 803B) moves from the back of the object (802A, 803A) to a side of the object. The angle difference between the moving direction of the virtual viewpoint (802D, 803D) and the moving direction of the object (802C, 803C) is greater than or equal to the threshold value, and the angle difference between the moving direction of the virtual viewpoint (802D, 803D) and the direction of the virtual viewpoint (802E, 803E) are greater than or equal to the threshold value. In this case, the condition that the angle difference between the moving direction of the virtual viewpoint (802D, 803D) and the moving direction of the object (802C, 803C) is smaller than the threshold value is not satisfied, Thus, the update interval of the virtual viewpoint is equal to the frame update interval of the virtual viewpoint image, that is, 1/60 seconds.

In a time slot 804, the virtual viewpoint 804B moves in parallel with the object 804A at the same speed. The angle difference between the moving direction 804D of the virtual viewpoint and the moving direction 804C of the object is smaller than the threshold value, and the angle difference between the moving direction 804D of the virtual viewpoint and the direction 804E of the virtual viewpoint is greater than or equal to the threshold value, and thus the condition is satisfied, Thus, the control unit 207 sets the update interval of the virtual viewpoint to be equal to the update interval of the material data, that is, 1/30 second.

In a time slot 805, the object 805A moves away from the virtual viewpoint 805B. The angle difference between the moving direction 805D of the virtual viewpoint and the moving direction 805C of the object is greater than or equal to the threshold value, and the angle difference between the moving direction (805D) of the virtual viewpoint and the viewpoint direction (805E) is greater than or equal to the threshold value. In this case, the condition that the angle difference between the moving direction 805D of the virtual viewpoint and the moving direction 805C of the object is smaller than the threshold value is not satisfied, Thus, the control unit 207 sets the update interval of the virtual viewpoint to be equal to the frame update interval of the virtual viewpoint image, that is, 1/60 seconds.

Next, with reference to FIG. 9, the third example is described in which the control unit 207 controls the update interval of the virtual viewpoint based on the result of the determination acquired from the shake determination unit 205. More specifically, when it is determined that shaking of the object occurs in the generated virtual viewpoint image, control is performed so as to increase the update interval of the virtual viewpoint such that the shaking is suppressed.

The virtual viewpoint image is in slow motion continuously for a period from a time slot 901 to a time slot 905, and the update interval of the material data is 1/20 seconds. In the time slot 901 and the time slot 902, the virtual viewpoint image is a slow-motion image, and the material data update interval is 1/20 seconds. Since the shake determination unit 205 determines that no shaking occurs on the object, the update interval of the virtual viewpoint is set to be equal to the frame update interval of the virtual viewpoint image, that is 1/60 seconds.

In the time slot 903, the shake determination unit 205 determines that shaking occurs in a third frame as counted from a frame in which material data is updated. In response, the control unit 207 sets the update interval of the virtual viewpoint to 1/30 seconds to prevent the update interval of the virtual viewpoint from being too long while keeping the difference between the update interval of the virtual viewpoint and the update interval of the material data to be smaller than 2 frames.

In the time slot 904, the shake determination unit 205 determines that shaking occurs in a second frame as counted from the frame in which material data is updated. Thus, the control unit 207 sets the update interval of the virtual viewpoint to 1/20 seconds such that the difference between the update interval of the virtual viewpoint and the update interval of the material data is less than 1 frame.

In the time slot 905, the shake determination unit 205 determines that shaking occurs in a third frame as counted from the frame in which the material data is updated. In response, the control unit 207 sets the update interval of the virtual viewpoint to 1/30 seconds to prevent the update interval of the virtual viewpoint from being too long while keeping the difference between the update interval of the virtual viewpoint and the update interval of the material data to be smaller than 2 frames.

Other Embodiments

The image processing system 10 and examples of processes performed by the image processing system 10 have been described above. Note that the present disclosure is not limited to embodiments described above, but various modifications are possible. Furthermore, the above-described embodiments may be partially combined appropriately.

For example, in the above-described embodiments, the description has focused on the case where the frame rate of the material data and the frame rate of the virtual viewpoint image are the same, but the present disclosure is not limited to such a case. For example, when one of the frame rate of the material data and the frame rate of the virtual viewpoint image is a multiple of the other, the processes described above in the embodiments are applicable. Furthermore, even when one of the frame rates is not a multiple of the other, the processes according to the embodiments can be applied by performing a frame rate conversion using a known technique (2-3 pulldown, etc.). More specifically, for example, when the frame rate of material data for the multi-viewpoint image or the like is 50 fps and the frame rate of a virtual viewpoint image to be finally generated is 60 fps, the embodiments are applicable. In such a case, a 50-fps virtual viewpoint image may be generated by controlling the update interval of the virtual viewpoint according to the technique described above, and the obtained 50-fps virtual viewpoint image may be converted to a 60-fps virtual viewpoint image. Thus, it is possible to obtain a 60-fps virtual viewpoint image with suppressed shaking of an object.

According to the above-mentioned embodiment(s), it is possible to suppress an occurrence of an unnatural movement of an object in a virtual viewpoint image.

Embodiment(s) of the present disclosure can also be realized by a computer of a system or apparatus that reads out and executes computer executable instructions (eg, one or more programs) recorded on a storage medium (which may also be referred to more fully as a 'non-transitory computer-readable storage medium') to perform the functions of one or more of the above-described embodiment(s) and/or that includes one or more circuits (eg, application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (eg, central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-138006, filed Jul. 26, 2019, which is hereby incorporated by reference herein in its entirety.

What is claimed is:

1. An information processing apparatus comprising:
one or more memories storing instructions; and
one or more processors executing the instructions to:
acquire update information representing a frame update interval on a virtual viewpoint moving image that is reproduced by updating a virtual viewpoint image at the frame update interval, the virtual viewpoint image being generated using i) multi-viewpoint images based on image capturing, from a plurality of different positions, by a plurality of image capturing apparatuses and which is to be used for generating the virtual viewpoint moving image, and ii) viewpoint information representing a position of a virtual viewpoint and a direction from the virtual viewpoint;
acquire frame information of the multi-viewpoint images, the frame information including information of a plurality of frames corresponding to different imaging times; and
generate the viewpoint information based on the acquired update information and the acquired frame information, wherein
the viewpoint information is generated by updating at an interval longer than the frame update interval on the virtual viewpoint moving image corresponding to a reproduction period, in a case where an update interval of multi-viewpoint images is changed is longer than the frame update interval on the virtual viewpoint moving image.

2. The information processing apparatus according to claim 1, wherein an update interval of the viewpoint information is equal to the update interval of the multi-viewpoint image.

3. The information processing apparatus according to claim 1, wherein the frame information represents at least one of the frame update interval of the multi-viewpoint image, a number of frames of the multi-viewpoint image, and a time corresponding to the frame of the multi-viewpoint image.

4. The information processing apparatus according to claim 1, wherein
in a case where a specific condition is satisfied, an update interval of the viewpoint information is longer than the frame update interval on the virtual viewpoint moving image, and
in a case where the specific condition is not satisfied, an update interval of the viewpoint information is equal to the frame update interval on the virtual viewpoint moving image.

5. The information processing apparatus according to claim 4, wherein the specific condition includes a condition regarding a ratio between the number of frames of the virtual viewpoint moving image and the number of frames of the multi-viewpoint images.

6. The information processing apparatus according to claim 4, wherein the specific condition includes a condition in terms of at least one of a moving speed of an object that is a capturing target by the plurality of image capturing apparatuses and a changing speed of a virtual viewpoint in a three-dimensional space.

7. The information processing apparatus according to claim 4, wherein the specific condition includes a condition in terms of a relationship among a moving direction of an object that is a capturing target by the plurality of image capturing apparatuses, a moving direction of a virtual viewpoint, and a direction from a virtual viewpoint, in a three-dimensional space.

8. The information processing apparatus according to claim 4,
wherein the one or more processors further execute the instructions
determine whether shaking occurs on an object in the virtual viewpoint moving image when the update interval of the viewpoint information is set to a specific length, and
the specific condition includes a condition in terms of a result of the determination.

9. The information processing apparatus according to claim 1, wherein the viewpoint information represents a position of a virtual viewpoint and a direction from the virtual viewpoint at each time point in a plurality of time points corresponding to the frame update interval on the virtual viewpoint moving image.

10. The information processing apparatus according to claim 1, wherein the one or more processors further execute the instructions to determine the update interval of the viewpoint information, and the viewpoint information represents a position of a virtual viewpoint and a direction from the virtual viewpoint at each time point in a plurality of time points corresponding to determined update intervals.

11. The information processing apparatus according to claim 1, wherein the virtual viewpoint moving image is a slow-motion movie.

12. The information processing apparatus according to claim 1, wherein the multi-viewpoint images are a plurality of images captured by the plurality of image capturing apparatuses.

13. The information processing apparatus according to claim 1, wherein the multi-viewpoint images are a plurality of images obtained by extracting areas corresponding to an object from a plurality of images captured by the plurality of image capturing apparatuses.

14. The information processing apparatus according to claim 1, wherein the one or more processors further execute the instructions to generate the virtual viewpoint image based on the multi-viewpoint images and the viewpoint information.

15. The information processing apparatus according to claim 1, wherein the one or more processors further execute the instructions to output the viewpoint information to an image generation apparatus configured to generate the virtual viewpoint image using the multi-viewpoint images.

16. An information processing method comprising:
acquiring update information representing a frame update interval on a virtual viewpoint moving image that is reproduced by updating a virtual viewpoint image at the frame update interval, the virtual viewpoint image being generated using i) multi-viewpoint images based on image capturing, from a plurality of different positions, by a plurality of image capturing apparatuses and which is to be used for generating the virtual viewpoint moving image, and ii) viewpoint information representing a position of a virtual viewpoint and a direction from the virtual viewpoint;
acquiring frame information of the multi-viewpoint images, the frame information including information of a plurality of frames corresponding to different imaging times; and
generating the viewpoint information based on the acquired update information and the acquired frame information wherein the viewpoint information is generated by updating at an interval longer than the frame update interval on the virtual viewpoint moving image corresponding to a reproduction period, in a case where an update interval of multi-viewpoint images is changed is longer than the frame update interval on the virtual viewpoint moving image.

17. The information processing method according to claim 16, wherein an update interval of the viewpoint information is equal to the update interval of the multi-viewpoint image.

18. The information processing method according to claim 16,
in a case where a specific condition is satisfied, an update interval of the viewpoint information is longer than the frame update interval on the virtual viewpoint moving image, and
in a case where the specific condition is not satisfied, an update interval of the viewpoint information is equal to the frame update interval on the virtual viewpoint moving image.

19. A non-transitory computer-readable storage medium storing a program for causing a computer to execute an information processing method, the information processing method comprising:
acquiring update information representing a frame update interval on a virtual viewpoint moving image that is reproduced by updating a virtual viewpoint image at the frame update interval, the virtual viewpoint image being generated using i) multi-viewpoint images based on image capturing, from a plurality of different positions, by a plurality of image capturing apparatuses and which is to be used for generating the virtual viewpoint moving image, and ii) viewpoint information representing a position of a virtual viewpoint and a direction from the virtual viewpoint;
acquiring frame information of the multi-viewpoint images, the frame information including information of a plurality of frames corresponding to different imaging times; and
generating the viewpoint information based on the acquired update information and the acquired frame information wherein the viewpoint information is generated by updating at an interval longer than the frame update interval on the virtual viewpoint moving image corresponding to a reproduction period, in a case where an update interval of multi-viewpoint images is changed is longer than the frame update interval on the virtual viewpoint moving image.

* * * * *